United States Patent
Hikari et al.

(10) Patent No.: US 8,761,630 B2
(45) Date of Patent: Jun. 24, 2014

(54) POWER CONTROL METHOD, POWER CONTROL DEVICE, AND IMAGE FORMING APPARATUS

(75) Inventors: Yoshihiko Hikari, Toyohashi (JP); Munehiro Natsume, Toyokawa (JP); Teruhiko Toyoizumi, Tachikawa (JP); Kouei Cho, Toyokawa (JP); Kenichi Hayashi, Hino (JP); Nobuhiro Matsuo, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 120 days.

(21) Appl. No.: 13/617,848

(22) Filed: Sep. 14, 2012

(65) Prior Publication Data
US 2013/0071134 A1  Mar. 21, 2013

(30) Foreign Application Priority Data
Sep. 20, 2011 (JP) ................ 2011-204231

(51) Int. Cl.
*G03G 15/00* (2006.01)
(52) U.S. Cl.
CPC ..................... *G03G 15/80* (2013.01)
USPC ............. 399/88; 399/37; 399/67; 399/69; 399/400
(58) Field of Classification Search
USPC ........................ 399/37, 67, 69, 88
See application file for complete search history.

(56) References Cited

U.S. PATENT DOCUMENTS

2010/0316404 A1  12/2010  Fukuzawa et al.

FOREIGN PATENT DOCUMENTS

| JP | 52-134035 U | 10/1977 |
|---|---|---|
| JP | 58-014223 A | 1/1983 |
| JP | 2008-191333 A | 8/2008 |
| JP | 2010-186218 A | 8/2010 |
| JP | 2010-286649 A | 12/2010 |

OTHER PUBLICATIONS

Office Action (Notification of Reason(s) for Refusal) issued on Oct. 1, 2013, by the Japanese Patent Office in corresponding Japanese Patent Application No. 2011-204231, and an English Translation of the Office Action. (9 pages).

*Primary Examiner* — Walter L Lindsay, Jr.
*Assistant Examiner* — Roy Y Yi
(74) *Attorney, Agent, or Firm* — Buchanan Ingersoll & Rooney PC

(57) ABSTRACT

A power control method for supplying AC power to a first load and a second load is provided. The method includes supplying, to the first load, AC power corresponding to a range of a phase angle 0 to a phase angle $\phi1$ in each half cycle; and supplying, to the second load, AC power corresponding to a range of a phase angle $\phi2$ to a phase angle $\pi$ in each half cycle, wherein $\phi1$ is larger than 0 and not more than $\pi$, $\phi2$ is not less than 0 and smaller than $\pi$, and $\phi1$ is larger than $\phi2$.

16 Claims, 12 Drawing Sheets

ONE CONTROL PERIOD

POWER CONTROL METHOD, POWER CONTROL DEVICE, AND IMAGE FORMING APPARATUS

This application is based on Japanese patent application No. 2011-204231 filed on Sep. 20, 2011, the contents of which are hereby incorporated by reference.

BACKGROUND OF THE INVENTION

1. Field of the Invention

The present invention relates to an image forming apparatus using electrophotography, e.g., a copier, a printer, a facsimile machine, or a combination machine thereof.

2. Description of the Related Art

An image forming apparatus employing electrophotography fuses, by heat, an unfixed toner image formed on paper to fix the same thereon. Such an image forming apparatus is therefore provided with a heater as a heat source. When the heater is supplied with power, through up-regulation and through down-regulation are used to prevent a power supply voltage from dropping temporarily due to inrush currents. The through up-regulation is a control method in which power to be supplied to the heater is gradually increased with the lapse of time in an early stage where the heater is energized. The through down-regulation is a control method in which power to be supplied to the heater is gradually decreased with the lapse of time in a late stage where the heater is energized.

As power control methods such as the through up-regulation and the through down-regulation, control methods, e.g., phase control and wave number control, are used. FIG. 11 is a diagram showing a voltage waveform by using which the phase control is described. FIG. 12 is a diagram showing a voltage waveform by using which the wave number control is described.

The phase control is a control method for making power to be supplied to a load variable. To be specific, an AC power source supplies AC power to the load within a range of an arbitral phase angle in a half cycle to a zero-crossing point, and the arbitral phase angle is changed from one to another to make the power to be supplied to the load variable. For example, a voltage having the waveform shown in FIG. 11 is supposed to be applied to a heater as the load. In the illustrated example of FIG. 11, a half cycle corresponds to one control period. As shown in FIG. 11, as the voltage to be supplied per one control period is increased with the lapse of time, power to be supplied to the heater is also increased gradually.

The wave number control is another control method for making power to be supplied to a load variable. To be specific, a half cycle of AC power is regarded as one unit, and power to be supplied to the load is variable by turning ON or OFF for each half cycle. For example, a voltage having the waveform shown in FIG. 12 is supposed to be applied to a heater as the load. In the illustrated example of FIG. 12, four cycles correspond to one control period. As shown in FIG. 12, the amount of voltage to be supplied to the heater per one control period is 50%.

The phase control or the wave number control has been conventionally in use for power control. A combined method of the phase control and the wave number control has been also used. For example, such a combined method is disclosed in Japanese Laid-open Patent Publication No. 2010-286649. The phase control and the wave number control, however, suffer from the following drawbacks. In the phase control, a heater is turned ON or OFF during a half cycle of AC power. The phase control, therefore, presents a problem that a harmonic current distortion or switching noise occurs due to rapid changes in current caused when the heater is turned ON. The wave number control can reduce the harmonic current distortion or the switching noise. In the wave number control, however, voltage variations in an AC power source may be larger than that in the phase control, and flicker is likely to occur.

There is also provided a power control device using a boost chopper. Unfortunately, such a device is expensive.

In view of this, more preferable power control devices are desired, and some of such devices are actually proposed. For example, the following power control device is disclosed in Japanese Laid-open Patent Publication No. 2010-186218. The power control device includes two heaters driven by AC power, and a secondary electrical member such as a motor driven by DC power. When only any one of the heaters is supplied with power instead of both the heaters supplied with power, the secondary electrical member is supplied with power.

In the power control device, power supplied from an AC power source can be distributed to the individual heaters and the secondary electrical member, and the power factor can be improved. Therefore, the power can be used effectively in the power control device.

However, an image forming apparatus disclosed in Japanese Laid-open Patent Publication No. 2010-186218 is not capable of supplying power to the two heaters and the secondary electrical member at one time. For example, while supplying power to one of the heaters, the image forming apparatus cannot supply power to the other heater and the secondary electrical member. Thus, the image forming apparatus has a low degree of flexibility in amount of power supplied to each load. The image forming apparatus, therefore, has a difficulty in supplying power to each load appropriately.

SUMMARY

The present disclosure is directed to solve the problems pointed out above, and therefore, an object of an embodiment of the present invention is to supply the preferable amount of power to each load without reducing the power factor.

A power control method according to an aspect of the present invention is a power control method for supplying AC power to a first load and a second load. The method includes supplying, to the first load, AC power corresponding to a range of a phase angle 0 to a phase angle $\phi 1$ in each half cycle; and supplying, to the second load, AC power corresponding to a range of a phase angle $\phi 2$ to a phase angle $\pi$ in each half cycle; wherein $\phi 1$ is larger than 0 and not more than $\pi$, $\phi 2$ is not less than 0 and smaller than $\pi$, and $\phi 1$ is larger than $\phi 2$.

A power control method according to another aspect of the present invention is a power control method for supplying AC power to a first load, a second load, and a third load. The method includes supplying, to the first load, AC power corresponding to a range of a phase angle 0 to a phase angle $\phi 1$ in each half cycle; supplying, to the second load, AC power corresponding to a range of a phase angle $\phi 2$ to a phase angle $\pi$ in each half cycle; and supplying, to the third load, AC power corresponding to a range of a phase angle $\phi 3$ to a phase angle $\phi 4$ in each half cycle; wherein $\phi 1$ is larger than 0 and not more than $\pi$, $\phi 2$ is not less than 0 and smaller than $\pi$, $\phi 3$ is not less than 0 and smaller than $\phi 1$, and $\phi 4$ is not more than $\pi$ and larger than $\phi 2$.

An image forming apparatus according to an aspect of the present invention is an image forming apparatus including a first load and a second load to each of which an AC power source supplies AC power. The apparatus includes a first switching portion configured to control, in accordance with a phase angle, ON or OFF in each half cycle of first input power supplied to the first load; and a second switching portion configured to control, in accordance with a phase angle, ON or OFF in each half cycle of second input power supplied to the second load; wherein the first switching portion supplies, to the first load, AC power corresponding to a range of a phase angle 0 to a phase angle $\phi 1$ in each half cycle of the first input power by controlling ON or OFF in each half cycle of the first input power; the second switching portion supplies, to the second load, AC power corresponding to a range of a phase angle $\phi 2$ to a phase angle $\pi$ in each half cycle of the second input power by controlling ON or OFF in each half cycle of the second input power; and $\phi 1$ is larger than 0 and not more than $\pi$, $\phi 2$ is not less than 0 and smaller than $\pi$, and $\phi 1$ is larger than $\phi 2$.

These and other characteristics and objects of the present invention will become more apparent by the following descriptions of preferred embodiments with reference to drawings.

DESCRIPTION OF THE PREFERRED EMBODIMENTS

First, an outline of an image forming apparatus 1 according to an embodiment of the present invention is described.

Figure 1:
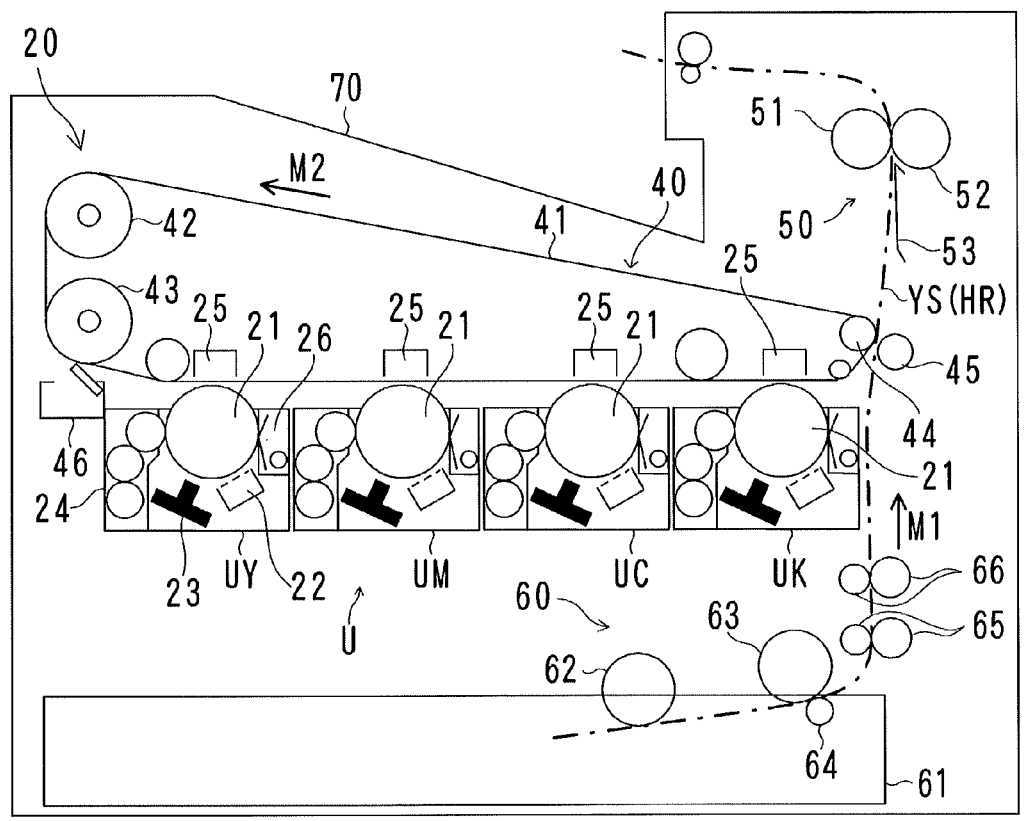
FIG. 1 is a schematic diagram showing an example of an inner structure of an image forming apparatus according to an embodiment of the present invention.

FIG. 1 is a schematic diagram showing an example of an inner structure of the image forming apparatus 1 according to an embodiment of the present invention. Referring to FIG. 1, the image forming apparatus 1 is a full-color image forming apparatus which contains therein a tandem print engine and uses electrophotography. The image forming apparatus 1 is an apparatus that is generally called a "multifunction device" or a "Multi-Functional Peripheral (MFP)". The image forming apparatus 1 is an apparatus in which various functions such as copying, network printing (PC printing), faxing, and scanning are consolidated.

The image forming apparatus 1 includes an image producing portion 20 and a paper feeding portion 60. The paper feeding portion 60 is provided with a paper cassette 61 for storing sheets of paper YS with different sizes, and rollers 62-66 for taking out sheets of paper YS, one by one, contained in the paper cassette 61 to convey the sheet of paper YS thus taken out to a transfer path HR. The sheet of paper YS conveyed to the transfer path HR is carried in the direction of the arrow M1.

The rollers 62-66 are specifically a pickup roller 62, a paper feed roller 63, a separator roller 64, a pair of delivery rollers 65, and a pair of registration rollers 66. The pickup roller 62 is operable to take a sheet of paper YS out of the paper cassette 61. The paper feed roller 63 is operable to convey the sheet of paper YS thus taken out to the transfer path HR. The separator roller 64 is provided to face the paper feed roller 63 with a sheet of paper YS interposed therebetween. The separator roller 64 serves to separate overlapping sheets of paper YS from each other to prevent the overlapping sheets of paper YS from being conveyed as-is to the transfer path HR. The pair of delivery rollers 65 serves to deliver each sheet of paper YS thus conveyed along the transfer path HR. The pair of registration rollers 66 serve to keep the sheet of paper YS temporarily and to supply the same to an intermediate transfer portion 40 at a predetermined time.

The image producing portion 20 is operable to produce an image onto paper by electrophotography. The image producing portion 20 is provided with an imaging unit U, the intermediate transfer portion 40, and a fixing unit 50.

The imaging unit U is configured of imaging units UY, UM, UC, and UK that correspond to four colors of Y (yellow), M (magenta), C (cyan), and K (black), respectively. The imaging units UY, UM, UC, and UK are disposed in the stated order along the intermediate transfer belt 41. Each of the imaging units UY, UM, UC, and UK includes a photoconductive drum 21, an electrostatic charger 22, an exposure unit 23 for exposing the surface of the photoconductive drum 21 to light to form an electrostatic latent image, a developer unit 24 for developing the electrostatic latent image by using toners having the individual colors to form a toner image, a transfer charger 25 for transferring the toner image onto the intermediate transfer belt 41 (primary transfer), a cleaner 26 for cleaning the surface of the photoconductive drum 21, and a non-illustrated transfer roller. The imaging unit U transfers toner images of the individual colors in order on the intermediate transfer belt 41 running in the direction of the arrow M2 in such a manner that the individual transfer positions (of the toner images) overlap each other.

The intermediate transfer portion 40 includes the intermediate transfer belt 41 onto which the toner images are to be transferred, a plurality of rollers 42, 43, and 44, and a secondary transfer roller 45. The intermediate transfer belt 41 is supported by the rollers 42-44. When the rollers 42-44 are rotationally driven, the intermediate transfer belt 41 runs in the direction of the arrow M2. The secondary transfer roller 45 is provided to face the roller 44 through the intermediate transfer belt 41. The secondary transfer roller 45 is attachable/detachable to/from the intermediate transfer belt 41. When the secondary transfer roller 45 is pressed into contact with the intermediate transfer belt 41, a transfer nip is formed between the secondary transfer roller 45 and the roller 44.

The sheet of paper YS is conveyed synchronously with the movement of the intermediate transfer belt 41, and comes to contact, at the transfer nip, the intermediate transfer belt 41 onto which the toner image has been formed. When a bias voltage is applied to the secondary transfer roller 45, the toner image on the intermediate transfer belt 41 is transferred onto the sheet of paper YS (secondary transfer). The sheet of paper YS onto which the toner image has been transferred through the secondary transfer is carried to the fixing unit 50.

The fixing unit 50 includes a heat roller 51 containing a heat source therein, a pressure roller 52 forming a nip between itself and the heat roller 51, and a sheet delivery guide 53. The sheet of paper YS on which the toner image has been formed is delivered to the fixing unit 50. The sheet delivery guide 53 guides the sheet of paper YS on the transfer path HR. Heat is applied to the sheet of paper YS at the nip between the heat roller 51 and the pressure roller 52. The toner is fused by the heat, so that the toner image is fixed onto the sheet of paper YS.

The sheet of paper YS on which the toner image has been fixed is delivered on the transfer path HR, and is outputted to a tray 70.

Figure 2:
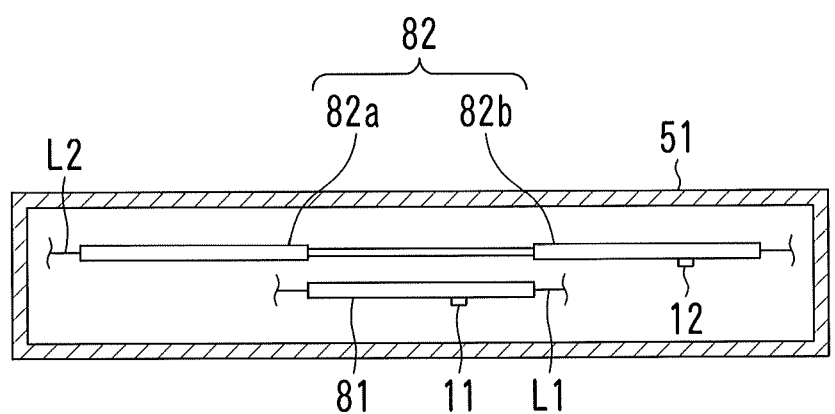
FIG. 2 is a perspective view showing an example of the inside of a heat roller of an image forming apparatus according to this embodiment.

The heat roller 51 contains therein a first heater 81 and a second heater 82 each of which is a halogen heater. FIG. 2 is a perspective view showing an example of the inside of the heat roller 51 of the image forming apparatus 1 according to this embodiment.

As shown in FIG. 2, the heat roller 51 contains therein the first heater 81 and the second heater 82. The first heater 81 is placed near the center of the heat roller 51. The first heater 81 has a rod-like shape extending in the direction of the axis of the heat roller 51. The first heater 81 applies heat to the center of the heat roller 51 and its vicinity. The second heater 82 has two heating portions 82a and 82b that are provided near both ends of the heat roller 51 and are spaced from each other. Alternatively, the heating portions 82a and 82b may be electrically connected to each other in series by a lead wire. Further, the first heater 81 and the second heater 82 are connected respectively to a lead wire L1 and a lead wire L2 that are supplied with power. Controlling the amount of power supplied from the lead wire L1 and the lead wire L2 makes it possible to control temperatures of the first heater 81 and the second heater 82.

The first heater 81 and the second heater 82 are provided with a first temperature sensor 11 and a second temperature sensor 12 respectively for measuring temperatures of the first heater 81 and the second heater 82.

Although not shown in FIG. 1, the image forming apparatus 1 is connected to an AC power source 35 that supplies power to the image forming apparatus 1. The image forming apparatus 1 is also provided with a power control device 30 and so on aside from the foregoing members. Hereinafter, how to control the temperature of the heat roller 51 is described. The power control device 30 and the foregoing members are also described below.

Figure 3:
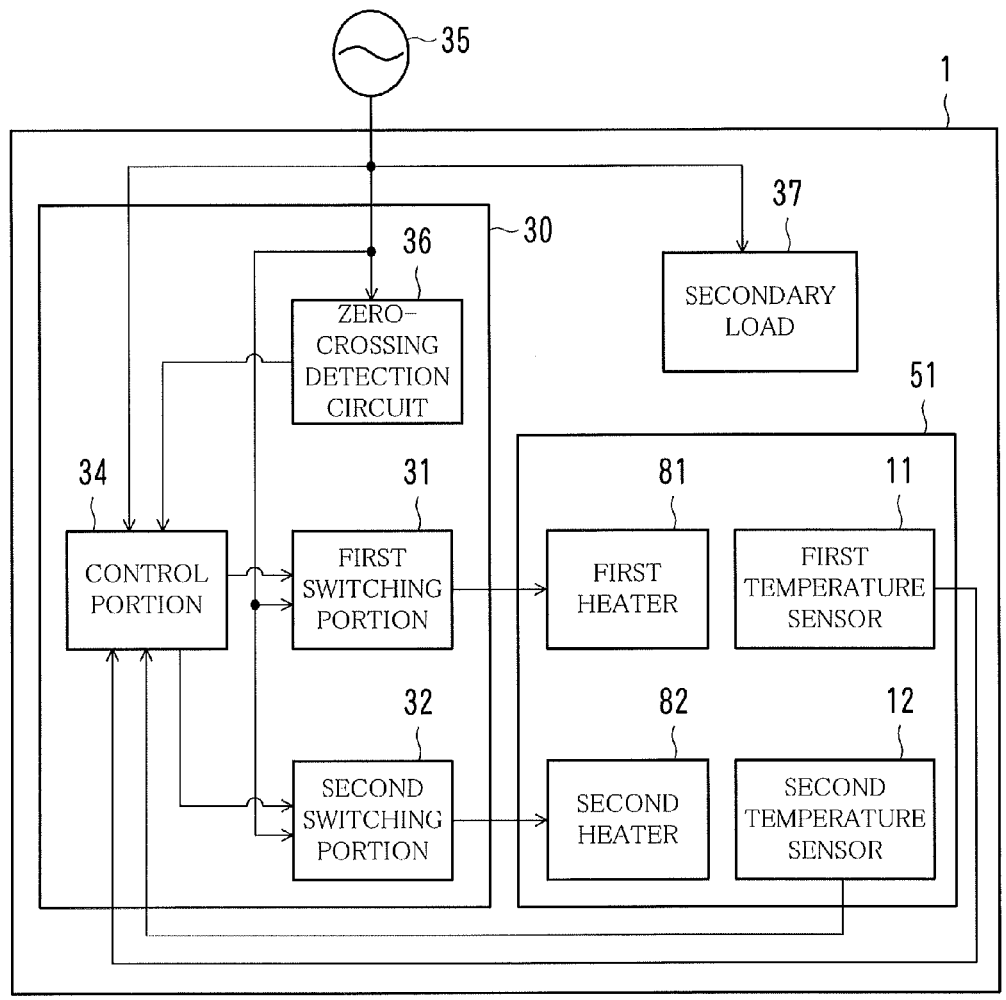
FIG. 3 is a block diagram showing an example of functions of parts relating to a power control device of an image forming apparatus according to this embodiment.

FIG. 3 is a block diagram showing an example of functions of parts relating to the power control device 30 of the image forming apparatus 1 according to this embodiment. As shown in FIG. 3, the image forming apparatus 1 includes the power control device 30, the heat roller 51, and a secondary load 37.

The AC power source 35 supplies AC power from a utility power to the image forming apparatus 1. The power control device 30 is supplied with the AC power from the AC power source 35, and a part of the AC power is supplied to the first heater 81 and the second heater 82 of the heat roller 51.

Another part of the AC power is supplied to the secondary load 37 that is a load different from the loads for heating the heat roller 51.

The secondary load 37 is a load used mainly for driving the rollers to be rotated. Other than this, a load for making an indication on a display is another example of the secondary load 37.

The power control device 30 includes a control portion 34, a first switching portion 31, a second switching portion 32, and a zero-crossing detection circuit 36.

The control portion 34 is implemented by, for example, a CPU and a non-volatile memory. The control portion 34 is operable to control operations of the individual portions of the image forming apparatus 1. The individual portions of the image forming apparatus 1 operate in accordance with instructions from the control portion 34. The control portion 34 is informed of operating states of the individual portions through signals sent therefrom, and manages the operations of the individual portions.

The zero-crossing detection circuit 36 detects a zero-crossing point of a voltage applied from the AC power source 35, and sends the detection result to the control portion 34. The control portion 34, then, determines the time at which the first switching portion 31 and the second switching portion 32 are turned ON or OFF based on the detection result, and send instructions to the first switching portion 31 and the second switching portion 32.

In response to the instructions from the control portion 34, the first switching portion 31 is turned into ON or OFF to control ON/OFF between the AC power source 35 and the first heater 81. In this way, the first switching portion 31 controls an amount of AC power to be supplied to the first heater 81.

In response to the instructions from the control portion 34, the second switching portion 32 is turned into ON or OFF to control ON/OFF between the AC power source 35 and the second heater 82. In this way, the second switching portion 32 controls an amount of AC power to be supplied to the second heater 82.

Each of the first switching portion 31 and the second switching portion 32 is implemented by a self arc suppression element such as an Insulated Gate Bipolar Transistor (IGBT) or a Metal-Oxide-Semiconductor Field-Effect Transistor (MOSFET). This enables the first switching portion 31 and the second switching portion 32 to control ON/OFF of the AC power at a predetermined phase angle.

The structure of the heat roller 51 is described earlier. The first heater 81 is connected to the AC power source 35 through the first switching portion 31. The second heater 82 is connected to the AC power source 35 through the second switching portion 32.

The first temperature sensor 11 for detecting the temperature of the first heater 81 sends a result of the detection to the control portion 34. The second temperature sensor 12 for detecting the temperature of the second heater 82 sends a result of the detection to the control portion 34. When receiving the detection results, the control portion 34 determines the time at which the first switching portion 31 and the second switching portion 32 are turned ON or OFF based on the detection results, and sends instructions to the first switching portion 31 and the second switching portion 32.

Each of the first temperature sensor 11 and the second temperature sensor 12 is implemented by, for example, a thermocouple.

When the first switching portion 31 is turned ON or OFF, the first heater 81 is supplied with AC power corresponding to a range of a phase angle 0 to a phase angle $\phi 1$ (radian) in each half cycle. When the second switching portion 32 is turned ON or OFF, the second heater 82 is supplied with AC power corresponding to a range of a phase angle φ2 to a phase angle π (radian) in each half cycle. Here, it is assumed that φ1 is larger than 0 and not more than π, φ2 is not less than 0 and smaller than π, and φ1 is larger than φ2. Thereby, there are no periods during which neither the first heater 81 nor the second heater 82 is supplied with AC power. In other words, this also means that there is a period during which both the first heater 81 and the second heater 82 are supplied with AC power. According to this arrangement, power loss does not occur in the entire heaters of the heat roller 51; therefore, the power factor of the power to be supplied to the heaters is high. The image forming apparatus 1 according to this embodiment is therefore high efficient.

The control portion 34 sends instructions to the first switching portion 31 and the second switching portion 32 depending on the current operating state of the image forming apparatus 1 so that the heat roller 51 has a preferable temperature. In accordance with the instructions from the control portion 34, the first switching portion 31 and the second switching portion 32 adjust the amounts of power to be supplied to the first heater 81 and the second heater 82.

For example, when the image forming apparatus 1 starts up, the first heater 81 and the second heater 82 are supplied with power based on through up-regulation, and the first switching portion 31 and the second switching portion 32 perform ON or OFF operation in such a manner that the amount of heat generated by the heat roller 51 increases with the lapse of time. Alternatively, when the image forming apparatus 1 is switched ON and the idling time thereof reaches a predetermined period of time, the image forming apparatus 1 is turned into a standby mode in view of power saving, so that the temperature of the heat roller 51 largely drops. Under such a situation, or, when the image forming apparatus 1 is switched OFF, the first switching portion 31 and the second switching portion 32 perform ON or OFF operation in such a manner that the amount of heat generated by the heat roller 51 reduces based on through down-regulation with the lapse of time.

For controlling the amount of heat generated by the heat roller 51, the first switching portion 31 and the second switching portion 32 preferably change the values of the phase angles φ1 and φ2. Changing the values of the phase angles φ1 and φ2 makes it possible to adjust a period of time during which both the first heater 81 and the second heater 82 are supplied with power. Hereinafter, such a period of time is referred to as an overlap period. Adjusting the overlap period makes it possible to adjust the sum of the amount of power to be supplied to the first heater 81 and the amount of power to be supplied to the second heater 82. Stated differently, it is possible to adjust the amount of heat generated by the heat roller 51. As discussed earlier, each of the first switching portion 31 and the second switching portion 32 is implemented by a self arc suppression element. It is, therefore, possible to change the amount of power to be supplied to the first heater 81 and the amount of power to be supplied to the second heater 8 successively. This enables the amount of heat generated by the heat roller 51 to be adjusted in a wide range at a high degree of accuracy.

Figure 4:
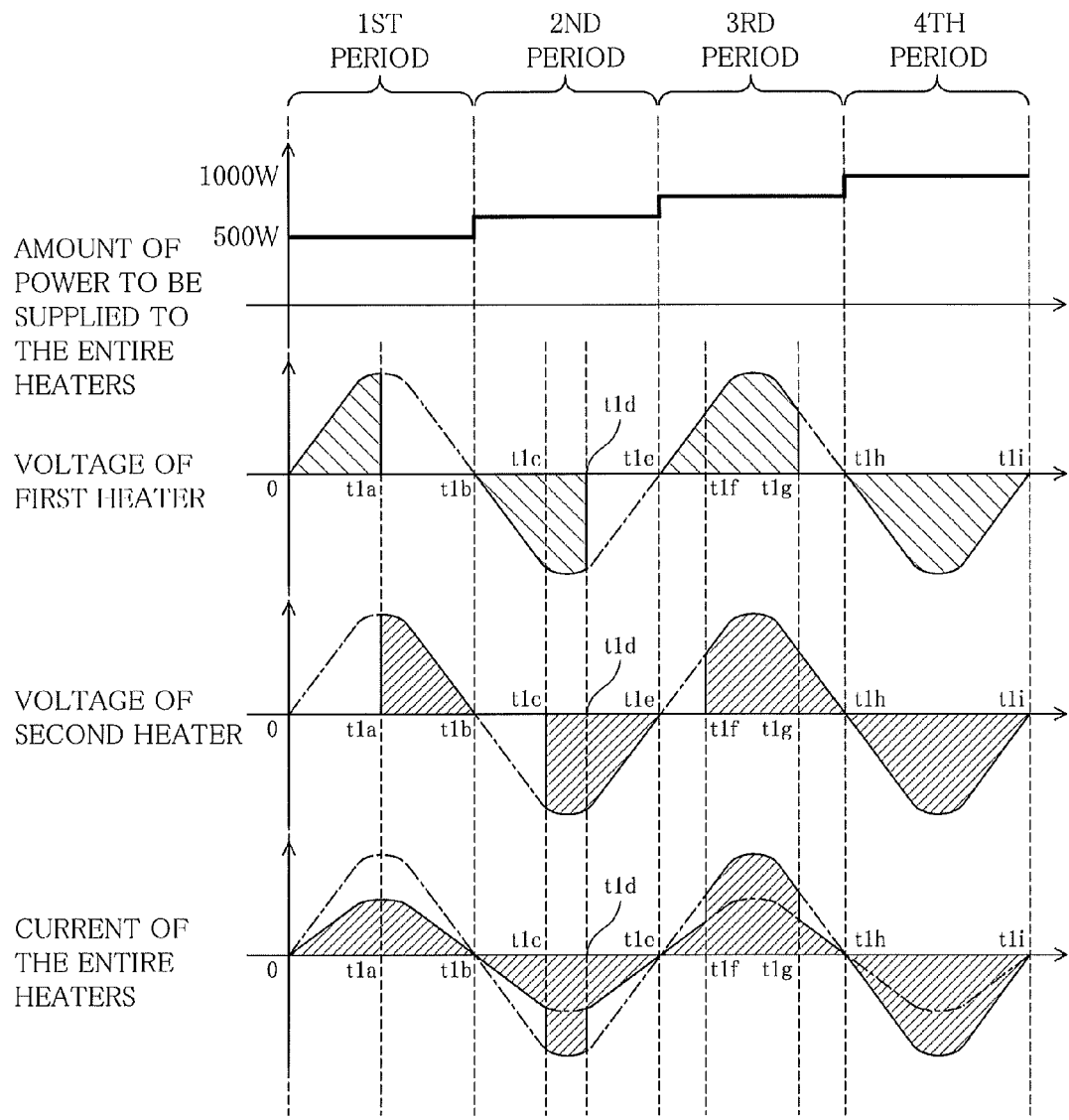
FIG. 4 is a timing chart showing an example of a power control method by an image forming apparatus.

The following is a description of an example of a power control method by the image forming apparatus 1 with reference to a timing chart. FIG. 4 is a timing chart showing an example of a power control method by the image forming apparatus 1. FIG. 4 shows, from top to bottom, power to be supplied to the entire heaters, a voltage of the first heater 81, a voltage of the second heater 82, and a current of the entire heaters, and shows the individual changes with the lapse of time. Note that the power to be supplied to the entire heaters is the sum of the power to be supplied to the first heater 81 and the power to be supplied to the second heater 82. Note also that the current of the entire heaters is the sum of the current flowing through the first heater 81 and the current flowing through the second heater 82.

FIG. 4 shows waveforms corresponding to two cycles. In other words, FIG. 4 shows waveforms corresponding to four half cycles. Hereinafter, the waveforms are shown with each half cycle given an order. As shown in FIG. 4, the four half cycles are described separately as a first period (time 0-t1b), a second period (time t1b-t1e), a third period (time t1e-t1h), and a fourth period (time t1h-t1i). Each of the periods corresponds to a half cycle, and has a range of 0-π period represented in phase angle.

Each of the first heater 81 and the second heater 82 is a 500-watt halogen heater. Control is made based on the through up-regulation in such a manner that power of the entire heaters is increased with the lapse of time.

Firstly, each waveform in the first period is described. A voltage is applied to the first heater 81 during a period of time 0-t1a. A voltage is applied to the second heater 82 during a period of time t1a-t1b. At this time, no overlap period is present. The current flowing through the entire heaters has a sine wave as that shown in FIG. 4. The power of the entire heaters in the first period is 500 watts.

Secondly, each waveform in the second period is described. A voltage is applied to the first heater 81 during a period of time t1b-t1d. A voltage is applied to the second heater 82 during a period of time tic-tie. At this time, a period of time t1c-t1d corresponds to an overlap period. The power of the entire heaters in the second period is greater than that in the first period by an amount corresponding to the overlap period. The current flowing through the entire heaters has a waveform as that shown in FIG. 4.

Thirdly, each waveform in the third period is described. A voltage is applied to the first heater 81 during a period of time t1e-t1g. A voltage is applied to the second heater 82 during a period of time t1f-t1h. At this time, a period of time t1f-t1g corresponds to an overlap period. The power of the entire heaters in the third period is greater than that in the second period. The current flowing through the entire heaters has a waveform as that shown in FIG. 4.

Finally, each waveform in the fourth period is described. A voltage is applied to the first heater 81 during a period of time t1h-t1i. A voltage is applied to the second heater 82 during the period of time t1h-t1i. At this time, the period of time t1h-t1i, i.e., the entirety of the fourth period, corresponds to an overlap period. The current flowing through the entire heaters has a sine wave as that shown in FIG. 4. The power of the entire heaters in the fourth period is greater than that in the third period, and is 1000 watts. The current flowing through the entire heaters has a waveform as that shown in FIG. 4.

In the case of the through up-regulation, e.g., of starting up the image forming apparatus 1, the first heater 81 and the second heater 82 are preferably controlled in the manner as discussed above. At this time, the control portion 34 preferably determines an overlap period in accordance with a temperature of the first heater 81 detected by the first temperature sensor 11 and a temperature of the second heater 82 detected by the second temperature sensor 12. It is preferable that the range of a phase angle for which the first heater 81 is turned ON and the range of a phase angle for which the second heater 82 is turned ON are determined in accordance with the necessary overlap period.

The control portion 34 sends instructions to the first switching portion 31 and the second switching portion 32 in such a manner that currents flow from a zero-crossing signal outputted from the zero-crossing detection circuit 36 to the first heater 81 and the second heater 82 in the ranges of the phase angles determined.

The first switching portion 31 and the second switching portion 32 control ON or OFF in accordance with the instructions from the control portion 34.

As described earlier, an overlap period between the first heater 81 and the second heater 82 is adjusted depending on the status of the image forming apparatus 1, so that an amount of heat generated by the heat roller 51 can be adjusted. Since neither the first heater 81 nor the second heater 82 is turned into OFF at one time, power loss does not occur. This prevents the power factor from dropping. While the through up-regulation is discussed above, regulations other than the through up-regulation can be carried out in a like manner.

The foregoing is the description of power control on the heaters of the heat roller 51. The image forming apparatus 1 is provided with the secondary load 37 in addition to the first heater 81 and the second heater 82. It is therefore preferable to determine how much power is to be supplied to the first heater 81 and the second heater 82, taking into consideration the power to be supplied to the secondary load 37. Hereinafter, a description is given of a power control method in which the power to be supplied to the secondary load 37 is considered.

Figure 5:
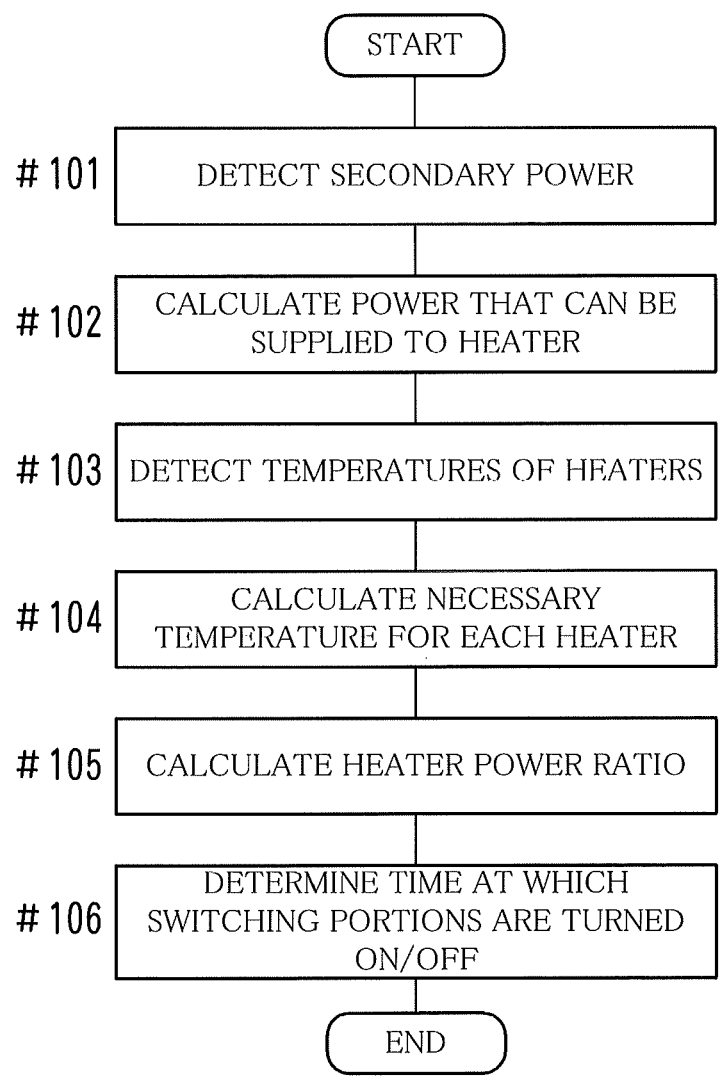
FIG. 5 is a flowchart depicting an example of a power control method with consideration given to a secondary load.

FIG. 5 is a flowchart depicting an example of a power control method with consideration given to the secondary load 37. With reference to FIG. 5, a description is given below of a power control method in which secondary power to be supplied to (consumed by) the secondary load 37 is considered.

The control portion 34 detects the power supplied to the secondary load 37 based on the operational states of the individual portions of the image forming apparatus 1 (Step #101).

The control portion 34 calculates, based on the power detected, heater-available power corresponding to power that can be supplied to heaters (Step #102). To be specific, the heater-available power is power corresponding to a difference between the maximum power and the detected secondary power supplied to the secondary load 37. The maximum power is maximum power that can be supplied to the image forming apparatus 1, and, in particular, is maximum power that can be supplied to the heat roller 51 and the secondary load 37. The maximum power is determined in advance, and the control portion 34 preferably stores the value of the maximum power in advance.

The first temperature sensor 11 and the second temperature sensor 12 detect the temperature of the first heater 81 and the temperature of the second heater 82, respectively (Step #103).

The control portion 34 calculates, based on the detected temperatures, necessary temperatures that are to be increased in order that the first heater 81 and the second heater 82 reach the respective target temperatures (Step #104). The target temperatures are temperatures set for the first heater 81 and the second heater 82 in order that the heat roller 51 has a predetermined temperature depending on the status of the image forming apparatus 1. The necessary temperature is a difference between the target temperature and the detected temperature.

The control portion 34 calculates, based on the necessary temperatures of the first heater 81 and the second heater 82 thus calculated, a heater power ratio that is a ratio between power to be supplied to the first heater 81 and power to be supplied to the second heater 82 (Step #105). The power to be supplied to the first heater 81 is power necessary to increase the temperature of the first heater 81 by an amount corresponding to the necessary temperature. Likewise, the power to be supplied to the second heater 82 is power necessary to increase the temperature of the second heater 82 by an amount corresponding to the necessary temperature.

The control portion 34 determines, based on the calculated heater power ratio and so on, the time at which the first switching portion 31 and the second switching portion 32 are turned ON or OFF (Step #106). It is possible to calculate, based on the calculated heater power ratio and the heater-available power calculated in Step #102, power to be supplied by which each of the first heater 81 and the second heater 82 has a preferable temperature. Thereby, a preferable phase angle φ1 and a preferable phase angle φ2 can be determined. When the phase angle φ1 and the phase angle φ2 are determined, the time at which the first switching portion 31 and the second switching portion 32 are turned ON or OFF can be determined.

A description is provided below, with reference to a timing chart, of a control method for employing the foregoing method to determine the time at which the first switching portion 31 and the second switching portion 32 are turned ON or OFF.

Figure 6:
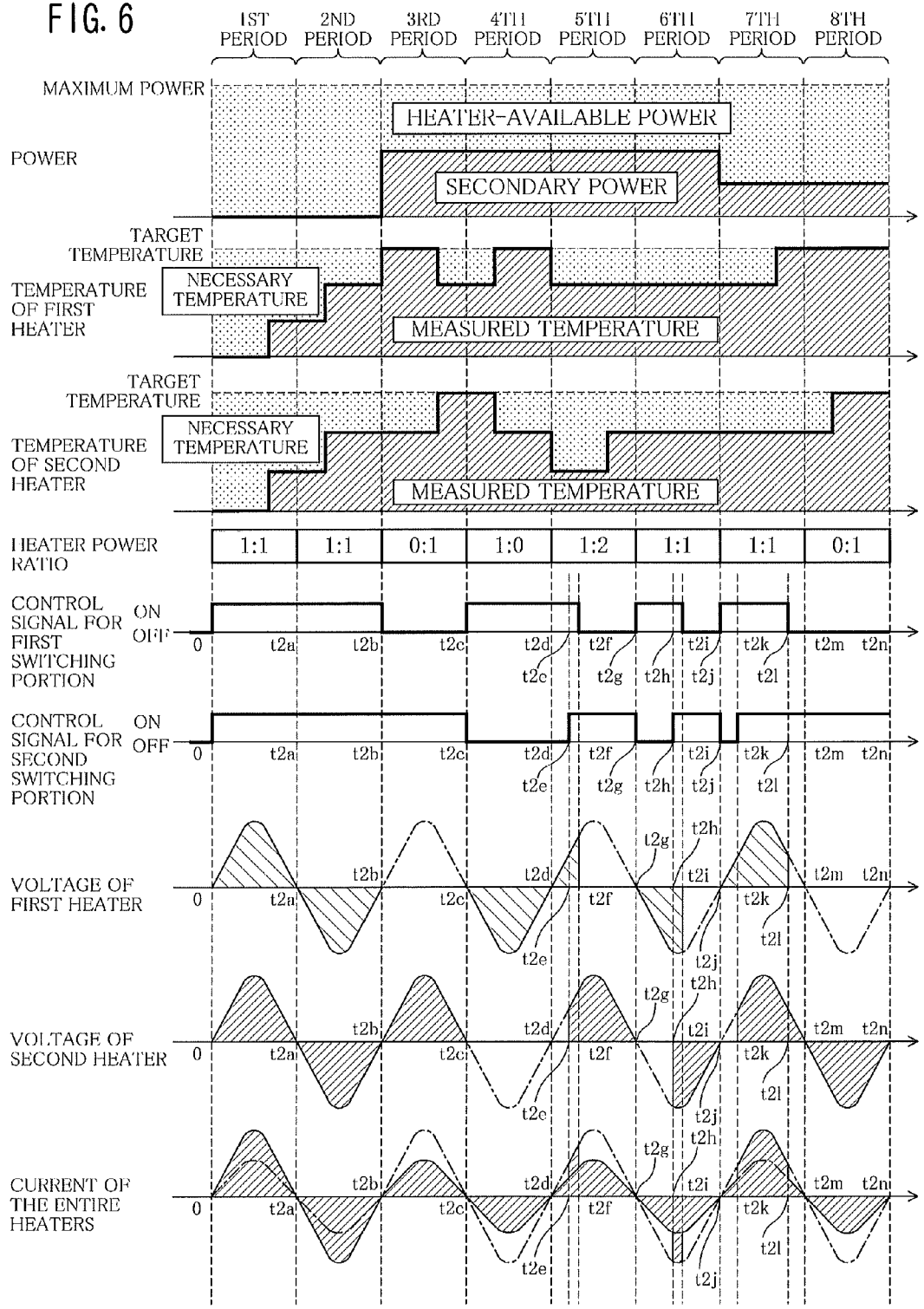
FIG. 6 is a timing chart depicting an example of a power control method with consideration given to a secondary load.

FIG. 6 is a timing chart depicting an example of a power control method with consideration given to the secondary load 37.

FIG. 6 shows waveforms corresponding to four cycles. In other words, FIG. 6 shows waveforms corresponding to eight half cycles. Hereinafter, the waveforms are shown with each half cycle given an order. As shown in FIG. 6, the eight half cycles are described separately as a first period (time 0-t2a), a second period (time t2a-t2b), a third period (time t2b-t2c), a fourth period (time t2c-t2d), a fifth period (time t2d-t2g), a sixth period (time t2g-t2j), a seventh period (time t2j-t2m), and an eighth period (time t2m-t2n). Each of the periods corresponds to a half cycle, and has a range of 0-π period represented in phase angle.

FIG. 6 shows, in the top, a relationship between power (secondary power) to be consumed by the secondary load 37 of the image forming apparatus 1 and power (heater-available power) which can be supplied to the first heater 81 and the second heater 82. To be specific, there is shown the proportion, to the maximum power available by the image forming apparatus 1, of the power consumed by the secondary load 37 and the power which can be supplied to the first heater 81 and the second heater 82.

FIG. 6 shows, in the second and third diagrams from the top, changes in temperatures of the first heater 81 and the second heater 82 measured by the first temperature sensor 11 and the second temperature sensor 12, respectively. In the diagrams, target temperatures of the individual heaters are shown. In each case, a difference between the target temperature and the temperature obtained by the measurement is a temperature to be increased by heating (necessary temperature).

FIG. 6 shows, in the fourth diagram from the top, a ratio (heater power ratio) between required power to be supplied to the first heater 81 and required power to be supplied to the second heater 82 so that the temperatures of the first heater 81 and the second heater 82 reach the individual target temperatures.

FIG. 6 shows, in the fifth and sixth diagrams from the top, control signals, for the first switching portion 31 and the second switching portion 32, which are necessary to realize the power ratio shown in the fourth diagram of FIG. 4.

FIG. 6 shows, in the seventh, eighth, and ninth diagrams from the top, a voltage of the first heater 81, voltage of the second heater 82, and a current flowing through the entire heaters, respectively, and shows the individual changes with the lapse of time.

In the first period and the second period, it is unnecessary to supply power to the secondary load 37. Accordingly, all the power available in the image forming apparatus 1 can be supplied to the first heater 81 and the second heater 82. Since the temperatures of the first heater 81 and the second heater 82 do not reach the individual target temperatures, the heater power ratio is 1:1. Therefore, a voltage is applied to each of the first heater 81 and the second heater 82 in a range corresponding to a phase angle of 0-π. In other words, both the first switching portion 31 and the second switching portion 32 are turned ON within a range of time 0-t2b. As for the first period and the second period, a period of time 0-t2a and a period of time t2a-t2b each corresponds to an overlap period.

In the third period, power to be supplied to the secondary load 37 increases. Among the power available in the image forming apparatus 1, half of the power or so can be supplied to the first heater 81 and the second heater 82. At time t2b corresponding to the starting point of the third period, the temperature of the first heater 81 reaches the target temperature, and the temperature of the second heater 82 does not reach the target temperature. It is, therefore, unnecessary to supply power to the first heater 81, and the heater power ratio is 0:1.

In view of this, the first switching portion 31 is turned OFF during a period of time t2b-t2c. The second switching portion 32 is turned ON during the period of, time t2b-t2c. Thereby, no voltage is applied to the first heater 81 during the period of time t2b-t2c. A voltage is applied to the second heater 82 during the period of time t2b-t2c. No overlap period is present.

In the fourth period, among the power available in the image forming apparatus 1, half of the power or so can be supplied to the first heater 81 and the second heater 82. At time t2c corresponding to the starting point of the fourth period, the temperature of the first heater 81 does not reach the target temperature, and the temperature of the second heater 82 reaches the target temperature. It is, therefore, unnecessary to supply power to the second heater 82, so that the heater power ratio is 1:0.

In view of this, the first switching portion 31 is turned ON during a period of time t2c-t2d. The second switching portion 32 is turned OFF during the period of time t2c-t2d. Thereby, a voltage is applied to the first heater 81 during the period of time t2c-t2d. No voltage is applied to the second heater 82 during the period of time t2c-t2d. No overlap period is present.

Likewise, in the fifth period, among the power available in the image forming apparatus 1, half of the power or so can be supplied to the first heater 81 and the second heater 82. At time t2d corresponding to the starting point of the fifth period, neither the temperature of the first heater 81 nor the temperature of the second heater 82 reaches the individual target temperatures. The temperature of the second heater 82 is lower than that of the first heater 81, and the heater power ratio is 1:2.

In view of this, the first switching portion 31 is turned ON during a period of time t2d-t2f. The second switching portion 32 is turned ON during a period of time t2e-t2g. Thereby, a voltage is applied to the first heater 81 during the period of time t2d-t2f. A voltage is applied to the second heater 82 during the period of time tee-t2g. A period of time t2e-t2f corresponds to an overlap period.

Further, in the sixth period, among the power available in the image forming apparatus 1, half of the power or so can be supplied to the first heater 81 and the second heater 82. At time t2g corresponding to the starting point of the sixth period, neither the temperature of the first heater 81 nor the temperature of the second heater 82 reaches the individual target temperatures. The temperature of the first heater 81 is equal to that of the second heater 82; therefore, the heater power ratio is 1:1.

In view of this, the first switching portion 31 is turned ON during a period of time t2g-t2i. The second switching portion 32 is turned ON during a period of time t2h-t2j. Thereby, a voltage is applied to the first heater 81 during the period of time t2g-t2i. A voltage is applied to the second heater 82 during the period of time t2h-t2j. A period of time t2h-t2i corresponds to an overlap period.

In the seventh period, the power to be supplied to the secondary load 37 is reduced. Among the power available in the image forming apparatus 1, 80% of the power or so can be supplied to the first heater 81 and the second heater 82. At time t2j corresponding to the starting point of the seventh period, neither the temperature of the first heater 81 nor the temperature of the second heater 82 reaches the individual target temperatures. The temperature of the first heater 81 is equal to that of the second heater 82; therefore, the heater power ratio is 1:1.

In view of this, the first switching portion 31 is turned ON during a period of time t2j-t2l. The second switching portion 32 is turned ON during a period of time t2k-t2m. Thereby, a voltage is applied to the first heater 81 during the period of time t2j-t2l. A voltage is applied to the second heater 82 during the period of time t2k-t2m. A period of time t2k-t2l corresponds to an overlap period.

Likewise, in the eighth period, among the power available in the image forming apparatus 1, 80% of the power or so can be supplied to the first heater 81 and the second heater 82. At time t2m corresponding to the starting point of the eighth period, the temperature of the first heater 81 reaches the target temperature, and the temperature of the second heater 82 does not reach the target temperature. It is, therefore, unnecessary to supply power to the first heater 81, so that the heater power ratio is 0:1.

In view of this, the first switching portion 31 is turned OFF during a period of time t2m-t2n. The second switching portion 32 is turned ON during the period of time t2m-t2n. Thereby, no voltage is applied to the first heater 81 during the period of time t2m-t2n. A voltage is applied to the second heater 82 during the period of time t2m-t2n. No overlap period is present.

According to the foregoing control method, as shown in the top diagram of FIG. 6, power that can be supplied to the heaters (heater-available power) is calculated (see Step #101 and Step #102 of FIG. 5) by subtracting the power to be supplied to the secondary load 37 (secondary power) from the maximum power available in the image forming apparatus 1. However, power that can be supplied to the heaters is predictable without such a calculation because power that can be supplied to the heaters is roughly determined depending on how the image forming apparatus 1 is driven. In short, as long as power that can be supplied to the heaters is determined in advance depending on how the image forming apparatus 1 is driven, it is possible to determine the amount of power that can be supplied to the heaters based on how the image forming apparatus 1 is driven.

Figure 7:
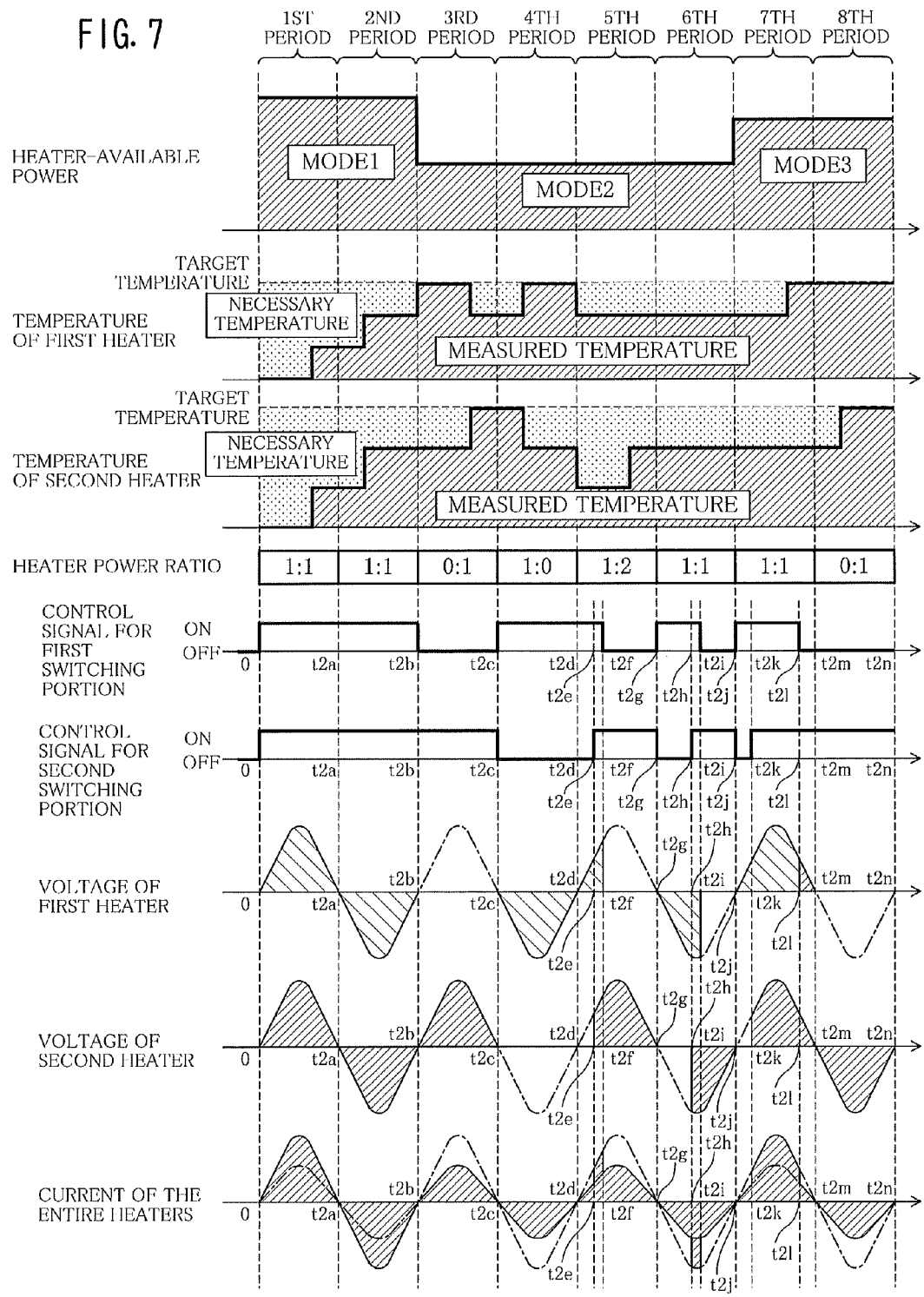
FIG. 7 is a timing chart depicting another example of a power control method with consideration given to a secondary load.

FIG. 7 is a timing chart depicting another example of a power control method with consideration given to a secondary load. In FIG. 7, drawings other than the top drawing are the same as those in FIG. 6, and therefore, descriptions thereof are omitted. In FIG. 7, it is supposed that three different driven modes 1-3 are provided as a driven state of the image forming apparatus 1.

FIG. 7 shows, in the top, power that can be supplied to the first heater 81 and the second heater 82 for cases where the image forming apparatus 1 is driven in mode 1, model, or mode 3. In the driven state as mode 1, no secondary load is used. For example, the mode 1 corresponds to a state where the image forming apparatus 1 is warmed up. In the driven state as mode 2, a finisher function is operated together with a copy function, for example. In the driven state as mode 3, only the copy function is operated, for example.

The control portion 34 preferably stores, in advance, values of heater-available power in the individual modes. The control portion 34 receives a signal indicating which mode the current driven state of the image forming apparatus 1 corresponds to, and thereby, the heater-available power in the first through eighth periods are easily determined.

Figure 8:
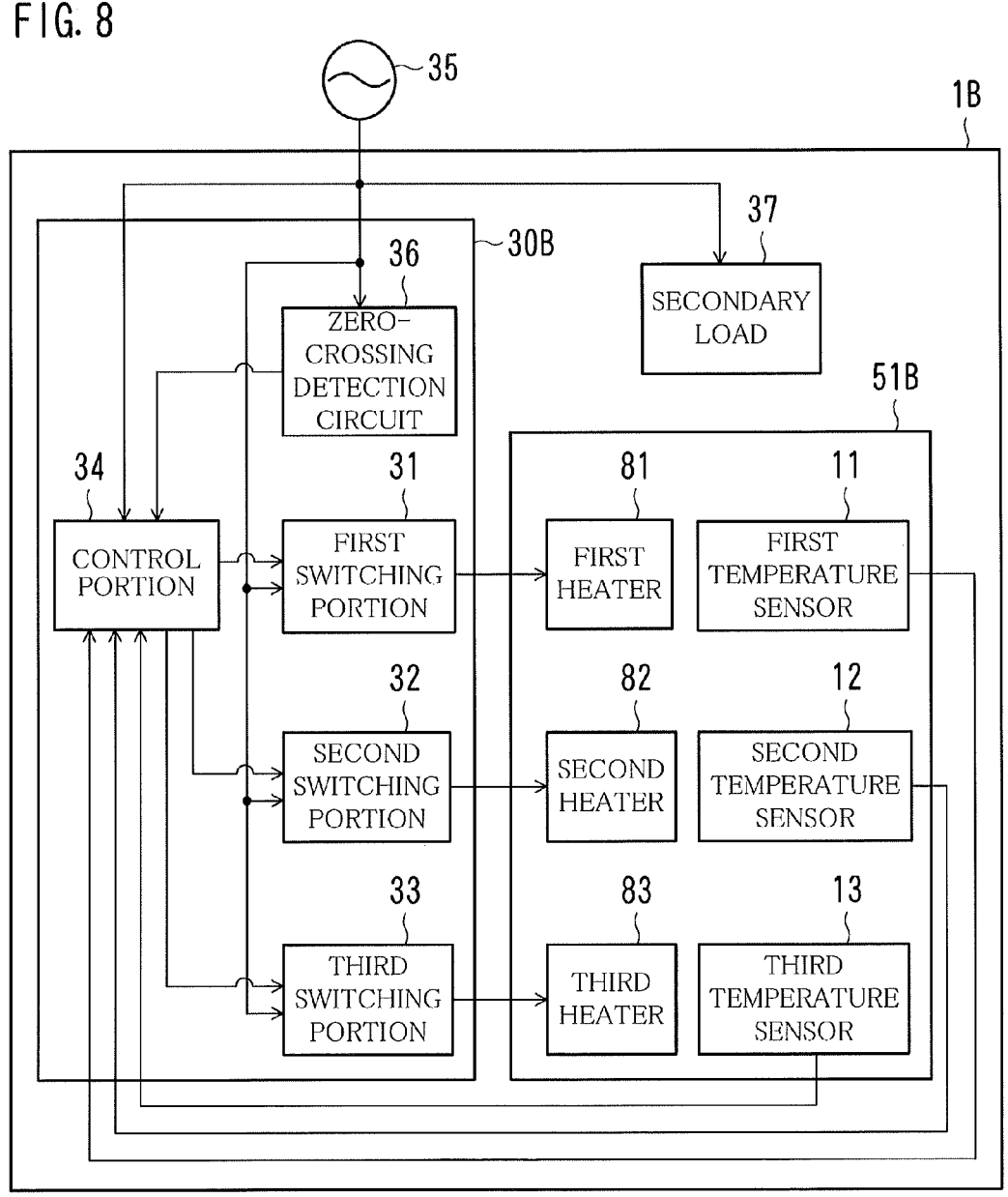
FIG. 8 is a block diagram showing an example of functions of parts relating to a power control device of an image forming apparatus according to a modification of this embodiment.
Figure 9:
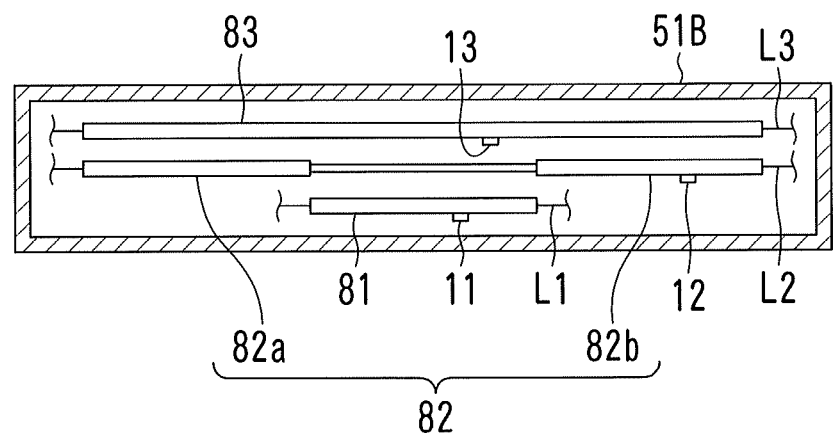
FIG. 9 is a perspective view showing an example of the inside of a heat roller of an image forming apparatus according to a modification of this embodiment.
Figure 10:
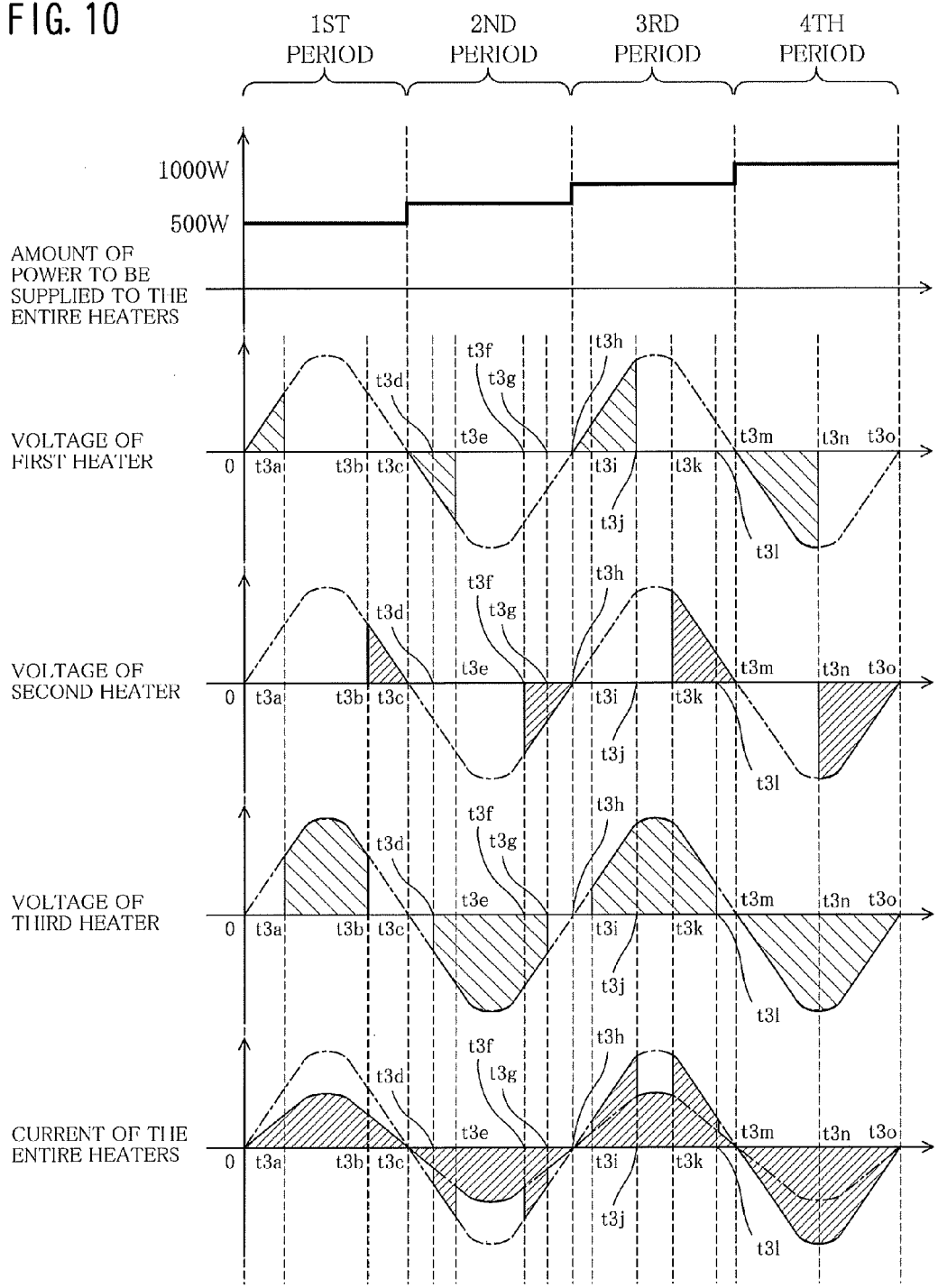
FIG. 10 is a timing chart showing an example of a power control method by an image forming apparatus according to a modification.
Figure 11:
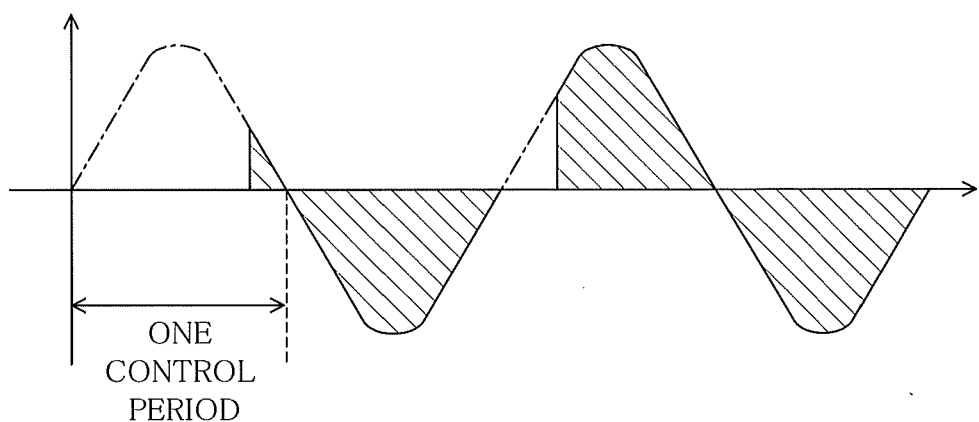
FIG. 11 is a diagram showing a voltage waveform by using which phase control is described.
Figure 12:
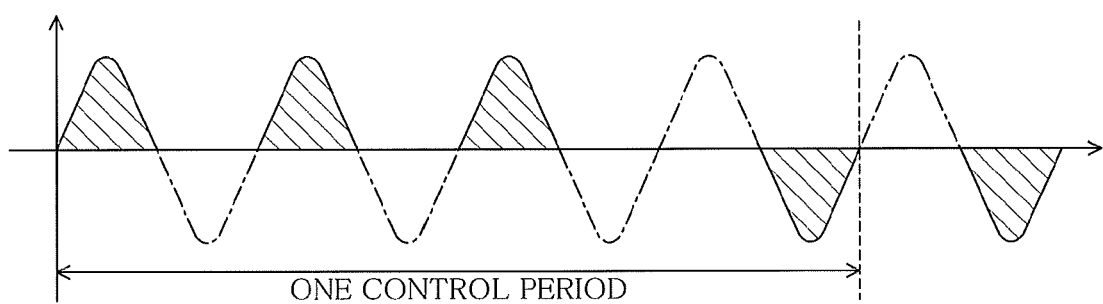
FIG. 12 is a diagram showing a voltage waveform by using which wave number control is described.

Hereafter, a modification of the image forming apparatus 1 is described. According to the foregoing description, the heat roller 51 has two heaters inside. Instead of this, the heat roller 51 may have three heaters inside. FIG. 8 is a block diagram showing an example of functions of parts relating to a power control device 30B of an image forming apparatus 1B according to the modification of the embodiment. FIG. 9 is a perspective view showing an example of the inside of a heat roller 51B of the image forming apparatus 1B according to the modification of the embodiment. FIG. 10 is a timing chart showing an example of a power control method by the image forming apparatus 1B according to the modification.

As shown in FIG. 8, the heat roller 51B according to the modification is structured by the heat roller 51 shown in FIG. 3, a third heater 83 implemented by a halogen heater, and a third temperature sensor 13 for measuring a temperature of the third heater 83. The power control device 30B according to the modification is structured by the power control device 30 shown in FIG. 3 and a third switching portion 33.

The third temperature sensor 13 for detecting a temperature of the third heater 83 sends the detection result to the control portion 34. As shown in FIG. 9, the heat roller 51B contains therein the first heater 81, the second heater 82, and the third heater 83. The first heater 81 has a rod-like shape and extends towards the both ends of the heat roller 51B in the direction of the axis of the heat roller 51B. The first heater 81 applies heat to the entirety of the heat roller 51B. The third heater 83 is connected to a lead wire L3 through which power is supplied. Controlling the amount of power supplied from the lead wire L3 makes it possible to control a temperature of the third heater 83. The third heater 83 is provided with the third temperature sensor 13 for temperature measurement. The third temperature sensor 13 may be, for example, a thermocouple.

The third switching portion 33 is provided in the power control device 30B. In response to instructions from the control portion 34, the third switching portion 33 is turned into ON or OFF to control ON/OFF between the AC power source 35 and the third heater 83. The third switching portion 33 is implemented by a self arc suppression element such as an IGBT or a MOSFET. This enables the third switching portion 33 to control the amount of AC power to be supplied to the third heater 83.

With the image forming apparatus 1B according to the modification, when the first switching portion 31 is turned ON or OFF, the first heater 81 is supplied with AC power corresponding to a range of a phase angle 0 to a phase angle $\phi1$ in each half cycle. When the second switching portion 32 is turned ON or OFF, the second heater 82 is supplied with AC power corresponding to a range of a phase angle $\phi2$ to a phase angle $\pi$ in each half cycle. When the third switching portion 33 is turned ON or OFF, the third heater 83 is supplied with AC power corresponding to a range of a phase angle $\phi3$ to a phase angle $\phi4$ in each half cycle.

Here, it is assumed that $\phi1$ is larger than 0 and not more than $\pi$, $\phi2$ is not less than 0 and smaller than $\pi$, $\phi3$ is not less than 0 and smaller than $\phi1$, and $\phi4$ is not more than $\pi$ and larger than $\phi2$. Thereby, there are no periods during which none of the first heater 81, the second heater 82, and the third heater 83 are supplied with AC power. In other words, this also means that there is a period during which at least any two of the first heater 81, the second heater 82, and the third heater 83 are supplied with AC power. According to this arrangement, power loss does not occur in the entire heaters of the heat roller 51B; therefore, the power factor of the power to be supplied to the heaters is high. The image forming apparatus 1B according to the modification is therefore high efficient.

For controlling the amount of heat generated by the heat roller 51B, the first switching portion 31, the second switching portion 32, and the third switching portion 33 preferably change the values of the phase angles $\phi1$, $\phi2$, $\phi3$, and $\phi4$. Changing the values thereof makes it possible to adjust a period of time during which at least any two of the first heater 81, the second heater 82, and the third heater 83 are supplied with AC power. Hereinafter, such a period of time is referred to as an overlap period. Adjusting the overlap period makes it possible to adjust the sum of the amount of power to be supplied to the first heater 81, the amount of power to be supplied to the second heater 82, and the amount of power to be supplied to the third heater 83, so that the amount of heat generated by the heat roller 51B can be adjusted.

The following is a description of an example of a power control method by the image forming apparatus 1B according to the modification with reference to FIG. 10. FIG. 10 shows, form top to bottom, power of the entire heaters, a voltage of the first heater 81, a voltage of the second heater 82, a voltage of the third heater 83, and a current of the entire heaters, and shows the individual changes with the lapse of time. Note that the power to be supplied to the entire heaters is the sum of the power to be supplied to the first heater 81, the power to be supplied to the second heater 82, and the power to be supplied to the third heater 83. Note also that the current of the entire heaters is the sum of the current flowing through the first heater 81, the current flowing through the second heater 82, and the current flowing through the third heater 83.

FIG. 10 shows waveforms corresponding to two cycles. In other words, FIG. 10 shows waveforms corresponding to four half cycles. Hereinafter, the waveforms are shown with each half cycle given an order. As shown in FIG. 10, the four half cycles are described separately as a first period (time 0-t3c), a second period (time t3c-t3h), a third period (time t3h-t3m), and a fourth period (time t3m-t3o). Each of the periods corresponds to a half cycle, and has a range of 0-$\pi$ period represented in phase angle.

Each of the first heater 81, the second heater 82, and the third heater 83 is a 500-watt halogen heater. Control is made based on the through up-regulation.

Firstly, each waveform in the first period is described. A voltage is applied to the first heater 81 during a period of time 0-t3a. A voltage is applied to the second heater 82 during a period of time t3b-t3c. A voltage is applied to the third heater 83 during a period of time t3a-t3b. At this time, no overlap period is present. The current flowing through the entire heaters has a sine wave as that shown in FIG. 10. The power of the entire heaters in the first period is 500 watts.

Secondly, each waveform in the second period is described. A voltage is applied to the first heater 81 during a period of time t3c-t3e. A voltage is applied to the second heater 82 during a period of time t3f-t3h. A voltage is applied to the third heater 83 during a period of time t3d-t3g. At this time, a period of time t3d-t3e and a period of time t3f-t3g each corresponds to an overlap period. The power of the entire heaters in the second period is greater than that in the first period by an amount corresponding to the overlap periods. The current flowing through the entire heaters has a waveform as that shown in FIG. 10.

Thirdly, each waveform in the third period is described. A voltage is applied to the first heater 81 during a period of time t3h-t3j. A voltage is applied to the second heater 82 during a period of time t3k-t3m. A voltage is applied to the third heater 83 during a period of time t3i-t3l. At this time, a period of time t3i-t3j and a period of time t3k-t3l each corresponds to an overlap period. The power of the entire heaters in the third period is greater than that in the second period. The current flowing through the entire heaters has a waveform as that shown in FIG. 10.

Finally, each waveform in the fourth period is described. A voltage is applied to the first heater 81 during a period of time t3m-t3n. A voltage is applied to the second heater 82 during a period of time t3n-t3o. A voltage is applied to the third heater 83 during a period of time t3m-t3o. At this time, the period of time t3m-t3o, i.e., the entirety of the fourth period, corresponds to an overlap period. The current flowing through the entire heaters has a sine wave as that shown in FIG. 10. The power of the entire heaters in the fourth period is greater than that in the third period, and is 1000 watts. The current flowing through the entire heaters has a waveform as that shown in FIG. 10.

The first heater 81, the second heater 82, and the third heater 83 are controlled in the manner discussed above, so that the through up-regulation is carried out. At this time, the control portion 34 preferably determines an overlap period in accordance with temperatures of the first heater 81, the second heater 82, and the third heater 83 detected by the first temperature sensor 11, the second temperature sensor 12, and the third temperature sensor 13 respectively. It is preferable that the ranges of phase angles for which the first heater 81, the second heater 82, and the third heater 83 are turned ON respectively are determined in accordance with the necessary overlap period.

The control portion 34 sends instructions to the first switching portion 31, the second switching portion 32, and the third switching portion 33 in such a manner that currents flow from a zero-crossing signal outputted from the zero-crossing detection circuit 36 to the first heater 81, the second heater 82, and the third heater 83 in the ranges of the phase angles determined.

The first switching portion 31, the second switching portion 32, and the third switching portion 33 control ON or OFF in accordance with the instructions from the control portion 34.

As described earlier, an overlap period among the first heater 81, the second heater 82, and the third heater 83 is adjusted depending on the status of the image forming apparatus 1B, so that an amount of heat generated by the heat roller 51B can be adjusted. Since none of the first heater 81, the second heater 82, and the third heater 83 are turned into OFF at one time, power loss does not occur. This prevents the power factor from dropping. While the through up-regulation is discussed above, regulations other than the through up-regulation can be carried out in a like manner.

In the image forming apparatuses 1 and 1B according to this embodiment, the preferable amount of power can be supplied to each load without reducing the power factor.

Up to this point, the image forming apparatuses 1 and 1B according to this embodiment are described. In the foregoing example, each of the first heater 81, the second heater 82, and the third heater 83 has a structure using a halogen heater. Instead of this, however, each of the first heater 81, the second heater 82, and the third heater 83 may be implemented by a carbon heater, an electrically-heated wire, a ceramic heater, an Induction Heating (IH) coil, or the like.

In the foregoing description, the second heater 82 is structured by the two heating portions 82a and 82b. However, the number of heating portions is not limited to two. The second heater 82 may be structured by one heating portion having a rod-like shape, as with the first heater 81 and the third heater 83. Alternatively, the second heater 82 may be structured by three or more heating portions. Likewise, each of the first heater 81 and the third heater 83 may be structured by two heating portions as with the second heater 82. Alternatively, each of the first heater 81 and the third heater 83 may be structured by three or more heating portions. As discussed above, the heater is structured by a plurality of heating portions. This increases a degree of flexibility in layout of heaters in the heat rollers 51 and 51B, which facilitates design.

According to the foregoing embodiments, each of the power control devices 30 and 30B has the control portion 34. Instead of this, however, the control portion 34 may be provided separately from the power control devices 30 and 30B.

In the embodiment discussed above, the overall configurations of the image forming apparatuses 1 and 1B, the configurations of various portions thereof, the shape, the size, the number, the material, and the composition thereof, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A power control method for supplying AC power to a first load and a second load, the method comprising:
   supplying, to the first load, AC power corresponding to a range of a phase angle 0 to a phase angle $\phi 1$ in each half cycle; and
   supplying, to the second load, AC power corresponding to a range of a phase angle $\phi 2$ to a phase angle $\pi$ in each half cycle;
   wherein $\phi 1$ is larger than 0 and not more than $\pi$, $\phi 2$ is not less than 0 and smaller than $\pi$, and $\phi 1$ is larger than $\phi 2$.

2. The power control method according to claim 1, comprising
   detecting a temperature of the first load and a temperature of the second load, and
   determining power to be supplied to the first load and the second load based on a difference between a target temperature of the first load and the detected temperature of the first load, a difference between a target temperature of the second load and the detected temperature of the second load, and power supplied to the first load and power supplied to the second load.

3. A power control method for supplying AC power to a first load, a second load, and a third load, the method comprising:

supplying, to the first load, AC power corresponding to a range of a phase angle 0 to a phase angle $\phi 1$ in each half cycle;

supplying, to the second load, AC power corresponding to a range of a phase angle $\phi 2$ to a phase angle $\pi$ in each half cycle; and supplying, to the third load, AC power corresponding to a range of a phase angle $\phi 3$ to a phase angle $\phi 4$ in each half cycle;

wherein $\phi 1$ is larger than 0 and not more than $\pi$, $\phi 2$ is not less than 0 and smaller than $\pi$, $\phi 3$ is not less than 0 and smaller than $\phi 1$, and $\phi 4$ is not more than $\pi$ and larger than $\phi 2$.

4. The power control method according to claim 3, comprising detecting a temperature of the first load, a temperature of the second load, and a temperature of the third load, and determining power to be supplied to the first load, the second load, and the third load based on a difference between a target temperature of the first load and the detected temperature of the first load, a difference between a target temperature of the second load and the detected temperature of the second load, a difference between a target temperature of the third load and the detected temperature of the third load, and power supplied to the first load, power supplied to the second load, and power supplied to the third load.

5. A power control device for supplying AC power to a first load and a second load from an AC power source, the device comprising:

a first switching portion configured to supply, to the first load, AC power corresponding to a range of a phase angle 0 to a phase angle $\phi 1$ in each half cycle among AC power fed from the AC power source by controlling ON or OFF between the AC power source and the first load; and a second switching portion configured to supply, to the second load, AC power corresponding to a range of a phase angle $\phi 2$ to a phase angle $\pi$ in each half cycle among the AC power fed from the AC power source by controlling ON or OFF between the AC power source and the second load;

wherein $\phi 1$ is larger than 0 and not more than $\pi$, $\phi 2$ is not less than 0 and smaller than $\pi$, and $\phi 1$ is larger than $\phi 2$.

6. The power control device according to claim 5, comprising an operation portion configured to externally receive a detection value of a temperature of the first load and a detection value of a temperature of the second load;

wherein the operation portion calculates a difference between a target temperature of the first load and the detection value of the temperature of the first load, and a difference between a target temperature of the second load and the detection value of the temperature of the second load, and determines power to be supplied to the first load and the second load based on the two calculated differences and power supplied to the first load and power supplied to the second load.

7. A power control device for supplying AC power to a first load, a second load, and a third load from an AC power source, the device comprising:

a first switching portion configured to supply, to the first load, AC power corresponding to a range of a phase angle 0 to a phase angle $\phi 1$ in each half cycle among AC power fed from the AC power source by controlling ON or OFF between the AC power source and the first load;

a second switching portion configured to supply, to the second load, AC power corresponding to a range of a phase angle $\phi 2$ to a phase angle $\pi$ in each half cycle among the AC power fed from the AC power source by controlling ON or OFF between the AC power source and the second load; and a third switching portion configured to supply, to the third load, AC power corresponding to a range of a phase angle $\phi 3$ to a phase angle $\phi 4$ in each half cycle among the AC power fed from the AC power source by controlling ON or OFF between the AC power source and the third load;

wherein $\phi 1$ is larger than 0 and not more than $\pi$, $\phi 2$ is not less than 0 and smaller than $\pi$, $\phi 3$ is not less than 0 and smaller than $\phi 1$, and $\phi 4$ is not more than $\pi$ and larger than $\phi 2$.

8. The power control device according to claim 7, comprising an operation portion configured to externally receive a detection value of a temperature of the first load, a detection value of a temperature of the second load, and a detection value of a temperature of the third load;

wherein the operation portion calculates a difference between a target temperature of the first load and the detection value of the temperature of the first load, a difference between a target temperature of the second load and the detection value of the temperature of the second load, and a difference between a target temperature of the third load and the detection value of the temperature of the third load, and determines power to be supplied to the first load, the second load, and the third load based on the three calculated differences and power supplied to the first load, power supplied to the second load, and power supplied to the third load.

9. An image forming apparatus including a first load and a second load to each of which an AC power source supplies AC power, the apparatus comprising:

a first switching portion configured to control, in accordance with a phase angle, ON or OFF in each half cycle of first input power supplied to the first load; and a second switching portion configured to control, in accordance with a phase angle, ON or OFF in each half cycle of second input power supplied to the second load;

wherein the first switching portion supplies, to the first load, AC power corresponding to a range of a phase angle 0 to a phase angle $\phi 1$ in each half cycle of the first input power by controlling ON or OFF in each half cycle of the first input power;

wherein the second switching portion supplies, to the second load, AC power corresponding to a range of a phase angle $\phi 2$ to a phase angle $\pi$ in each half cycle of the second input power by controlling ON or OFF in each half cycle of the second input power; and wherein $\phi 1$ is larger than 0 and not more than $\pi$, $\phi 2$ is not less than 0 and smaller than $\pi$, and $\phi 1$ is larger than $\phi 2$.

10. The image forming apparatus according to claim 9, comprising a first temperature sensor that is provided in the first load and is operable to detect a temperature of the first load, a second temperature sensor that is provided in the second load and is operable to detect a temperature of the second load, and an operation portion configured to receive a detection value by the first temperature sensor and a detection value by the second temperature sensor;

wherein the operation portion calculates a difference between a target temperature of the first load and the detection value of the temperature of the first load, and a difference between a target temperature of the second load and the detection value of the temperature of the second load, and determines power to be supplied to the first load and the second load based on the two calculated differences and power supplied to the first load and power supplied to the second load.

11. The image forming apparatus according to claim 10, comprising, in addition to the first load and the second load, a secondary load to which the AC power source supplies the AC power;
   wherein the operation portion detects secondary power supplied to the secondary load, stores, in advance, maximum power that is to be supplied to the first load, the second load, and the secondary load, and calculates a difference between the maximum power and the detected secondary power as power supplied to the first load and power supplied to the second load.

12. The image forming apparatus according to claim 10, wherein the operation portion stores, in advance, power that is to be supplied to the first load and the second load, the power changing depending on a driven state of the image forming apparatus, and detects the driven state to deem power that is to be supplied to the first load and the second load depending on the driven state as power supplied to the first load and power supplied to the second load.

13. An image forming apparatus including a first load, a second load, and a third load to each of which an AC power source supplies AC power, the apparatus comprising:
   a first switching portion configured to control, in accordance with a phase angle, ON or OFF in each half cycle of first input power supplied to the first load;
   a second switching portion configured to control, in accordance with a phase angle, ON or OFF in each half cycle of second input power supplied to the second load; and
   a third switching portion configured to control, in accordance with a phase angle, ON or OFF in each half cycle of third input power supplied to the third load;
   wherein the first switching portion supplies, to the first load, AC power corresponding to a range of a phase angle 0 to a phase angle $\phi1$ in each half cycle of the first input power by controlling ON or OFF in each half cycle of the first input power;
   wherein the second switching portion supplies, to the second load, AC power corresponding to a range of a phase angle $\phi2$ to a phase angle $\pi$ in each half cycle of the second input power by controlling ON or OFF in each half cycle of the second input power;
   wherein the third switching portion supplies, to the third load, AC power corresponding to a range of a phase angle $\phi3$ to a phase angle $\phi4$ in each half cycle of the third input power by controlling ON or OFF in each half cycle of the third input power; and
   wherein $\phi1$ is larger than 0 and not more than $\pi$, $\phi2$ is not less than 0 and smaller than $\pi$, $\phi3$ is not less than 0 and smaller than $\phi1$, and $\phi4$ is not more than $\pi$ and larger than $\phi2$.

14. The image forming apparatus according to claim 13, comprising
   a first temperature sensor that is provided in the first load and is operable to detect a temperature of the first load,
   a second temperature sensor that is provided in the second load and is operable to detect a temperature of the second load,
   a third temperature sensor that is provided in the third load and is operable to detect a temperature of the third load, and
   an operation portion configured to receive a detection value by the first temperature sensor, a detection value by the second temperature sensor, and a detection value by the third temperature sensor;
   wherein the operation portion calculates a difference between a target temperature of the first load and the detection value of the temperature of the first load, a difference between a target temperature of the second load and the detection value of the temperature of the second load, and a difference between a target temperature of the third load and the detection value of the temperature of the third load, and determines power to be supplied to the first load, the second load, and the third load based on the three calculated differences and power supplied to the first load, power supplied to the second load, and power supplied to the third load.

15. The image forming apparatus according to claim 14, comprising, in addition to the first load, the second load, and the third load, a secondary load to which the AC power source supplies the AC power;
   wherein the operation portion detects secondary power supplied to the secondary load, stores, in advance, maximum power that is to be supplied to the first load, the second load, the third load, and the secondary load, and calculates a difference between the maximum power and the detected secondary power as power supplied to the first load, power supplied to the second load, and power supplied to the third load.

16. The image forming apparatus according to claim 14, wherein the operation portion stores, in advance, power that is to be supplied to the first load, the second load, and the third load, the power changing depending on a driven state of the image forming apparatus, and detects the driven state to deem power that is to be supplied to the first load, the second load, and the third load depending on the driven state as power supplied to the first load, power supplied to the second load, and power supplied to the third load.

* * * * *